United States Patent [19]

Annapareddy et al.

[11] Patent Number: 5,577,211
[45] Date of Patent: Nov. 19, 1996

[54] SYSTEM AND METHOD USING CHAINED STRUCTURE QUEUES FOR ORDERING OF MESSAGE DELIVERY BETWEEN CONNECTED NODES WHEREIN UNSUCCESSFUL MESSAGE PORTION IS SKIPPED AND RETRIED

[75] Inventors: Narasimhareddy L. Annapareddy; James T. Brady; Damon W. Finney, all of San Jose; Richard F. Freitas, Morgan Hill, all of Calif.; Michael H. Hartung, Tucson, Ariz.; Michael A. Ko, San Jose, Calif.; Noah R. Mendelsohn, Arlington, Mass.; Jaishankar M. Menon, San Jose, Calif.; David R. Nowlen, Morgan Hill, Calif.; Shin-Yuan Tzou, San Jose, Calif.

[73] Assignee: IBM Corporation, Armonk, N.Y.

[21] Appl. No.: 241,920

[22] Filed: May 11, 1994

[51] Int. Cl.[6] ............................ G06F 13/00; G06F 13/38; G06F 15/16
[52] U.S. Cl. .................. 395/200.13; 395/872; 395/200.2
[58] Field of Search ................................ 395/250, 200.2, 395/872, 200.13

[56] References Cited

U.S. PATENT DOCUMENTS

| | | | |
|---|---|---|---|
| 4,430,651 | 2/1984 | Bryant et al. | 340/825.52 |
| 4,551,842 | 11/1985 | Segarra | 371/69 |
| 4,777,595 | 10/1988 | Strecker et al. | 395/200.17 |
| 4,807,111 | 2/1989 | Cohen et al. | 395/250 |
| 4,816,989 | 3/1989 | Finn et al. | 364/200 |
| 5,036,459 | 7/1991 | den Haan et al. | 364/200 |
| 5,086,428 | 2/1992 | Perlman et al. | 370/94.1 |
| 5,138,611 | 8/1992 | Carn et al. | 370/60 |
| 5,151,899 | 9/1992 | Thomas et al. | 370/94.1 |
| 5,212,724 | 5/1993 | Nazarenko et al. | 379/58 |
| 5,255,371 | 10/1993 | Latimer et al. | 395/250 |
| 5,317,692 | 5/1994 | Ashton et al. | 395/872 |

Primary Examiner—Thomas C. Lee
Assistant Examiner—D. Dinh
Attorney, Agent, or Firm—Ohlandt, Greeley, Ruggiero & Perle

[57] ABSTRACT

A computing system includes plural nodes that are connected by a communications network. Each node comprises a communications interface that enables an exchange of messages with other nodes. A ready queue is maintained in a node and includes plural message entries, each message entry indicating an output message control data structure. The node further includes memory for storing plural output message control data structures, each including one or more chained further monrtol data structures that define data comprising a message or a portion of a message that is to be dispatched. Control data structures that are chained from an output messsage control data structure exhibit a sequence dependincy. A processor is controlled by the ready queue and enables dispatch of portions of the message designated by an output message control data structure and associated further control structures. The processor prevents dispatch of one portion of a message prior to dispatch of another portion of the message upon which the first portion is dependent even if message transmissions are interrupted.

8 Claims, 7 Drawing Sheets

(DATA)

(DATA)

(CONTROL MESSAGE)

(CONTROL MESSAGE)

SYSTEM AND METHOD USING CHAINED STRUCTURE QUEUES FOR ORDERING OF MESSAGE DELIVERY BETWEEN CONNECTED NODES WHEREIN UNSUCCESSFUL MESSAGE PORTION IS SKIPPED AND RETRIED

FIELD OF THE INVENTION

This invention relates to data transmission procedures in a multi-nodal network and, more particularly, to apparatus and procedures for enabling all messages in a network transmission to be delivered in a predetermined order, even in the event that the transmission is discontinued and restarted at a later time.

BACKGROUND OF THE INVENTION

The prior art has handled ordering of transmitted messages in a multi-nodal network through use of various instrumentalities. Most systems use high-level protocols to achieve message ordering. Such protocols are complicated, require extensive software processing and in many such systems, protocol processing dominates the communication overhead. Examples of such software-based high level protocols can be found in U.S. Pat. No. 5,086,428 to Perlman et al. and U.S. Pat. No. 5,151,899 to Thomas et al.

Perlman et al. employ packets which contain data identifying an originating node, a sequence number which indicates a packet's place in a sequence of packets, and an age value. A data base at a receiving node is updated by newly received packets. However, the nodes themselves are reset if packets currently in the network exhibit later sequence numbers than newly received packets. Thomas et al. describe a system which tracks sequence numbers in packets transmitted over a data communication network. Thomas et al. employ a bounded sequence number window and ignore any packet number below or above the window. A received packet map is maintained to keep track of which sequence numbers have been received and to enable filtering out of duplicate sequence numbers.

Other prior art systems achieve ordering of messages through the use of hardware protocol engines which implement standard protocols. This approach often results in overly complicated hardware because a standard protocol engine does not exploit properties of a specific network but rather is required to interface with a plurality of networks. Such hardware protocol engines also create new hardware/software interfaces and usually become a new source of software overhead. Other parallel computer systems that communicate through an interconnection network allow each node in the network to have, at most, one outstanding message at a time. This results in a decrease in efficiency of the use of network bandwidth.

Accordingly, it is an object of this invention to provide an improved message delivery system which guarantees that an ordered series of messages will be received in the required order.

It is another object of this invention to provide an improved message delivery system in a multi-nodal network, wherein minimal message handshaking is employed.

It is yet another object of this invention to provide an improved message delivery system in an internodal network wherein hardware is employed to control message ordering and transmission.

SUMMARY OF THE INVENTION

A computing system includes plural nodes that are connected by a communications network. Each node comprises a communications interface that enables an exchange of messages with other nodes. A ready queue is maintained in a node and includes plural message entries, each message entry indicating an output message control data structure. The node further includes memory for storing plural output message control data structures, each including one or more chained further control data structures that define data comprising a message or a portion of a message that is to be dispatched. Control data structures that are chained from an output message control data structure exhibit a sequence dependency. A processor is controlled by the ready queue and enables dispatch of portions of the message designated by an output message control data structure and associated further control structures. The processor prevents dispatch of one portion of a message prior to dispatch of another portion of the message upon which the first portion is dependent even if message transmissions are interrupted.

DETAILED DESCRIPTION OF THE INVENTION

MESSAGE SEQUENCING PROCEDURE

Figure 1:
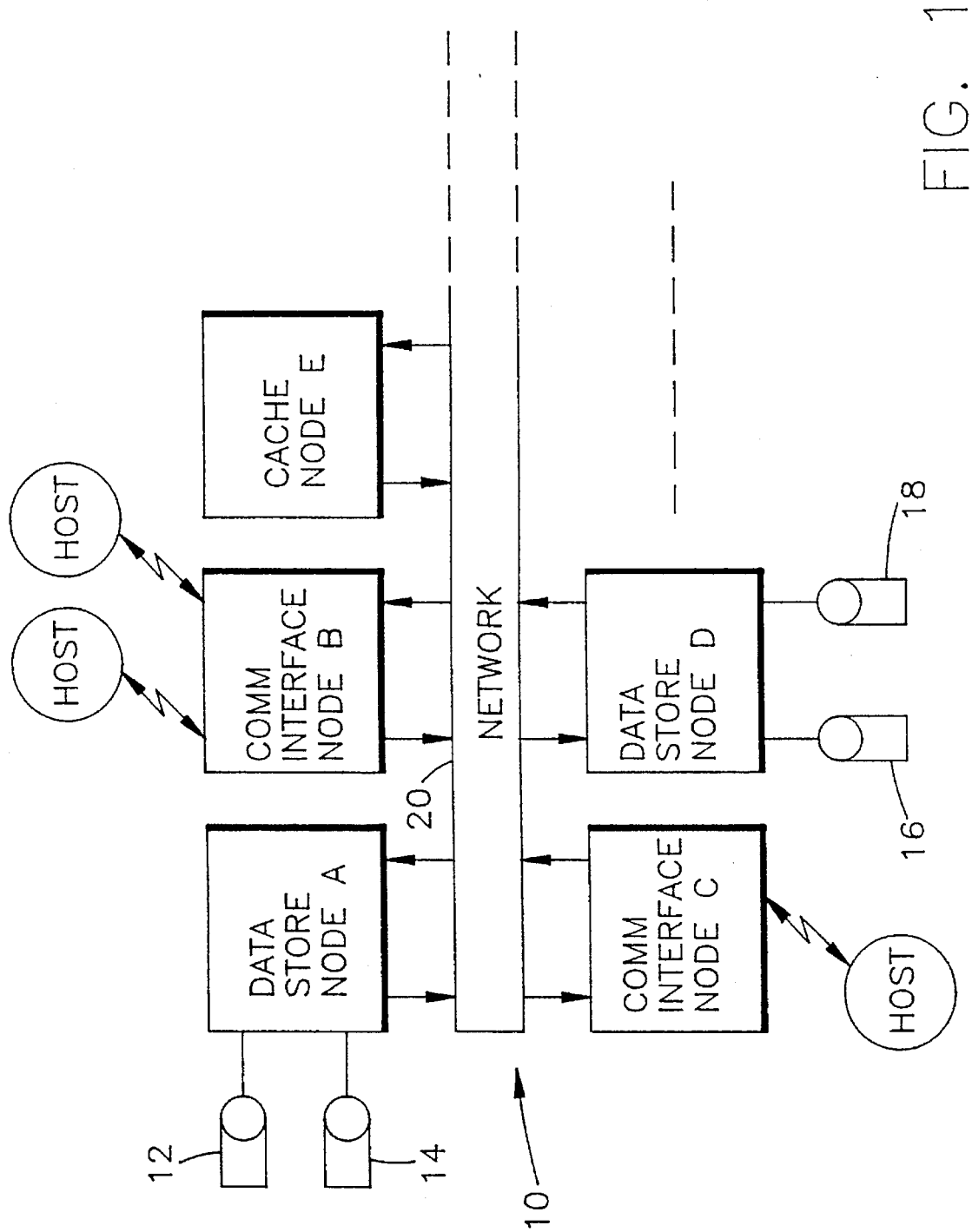
FIG. 1 is a block diagram illustrating a nodal disk array for a host processor.

Each node in a multi-node system includes multiple logical input ports and multiple logical output ports. Message control is exerted by hardware-based input and output ports in the node. A communication transmission (hereafter referred to as a "transmission") is a sequence of messages sent from an output port to an input port. A transmission may be continuous or may occur in discontinuous segments. Logically, multiple transmissions can be active at the same time. Separate communication paths are provided for control and data messages In each node, the hardware manages two levels of outgoing message queues. Active transmissions form a first level queue, and there may be plural ones of these first level queues, each one exhibiting a different priority. Each entry in a queue is tile head of a second level queue which links together all messages belonging to a corresponding transmission.

Queues of transmissions are managed so as to enable higher priority messages to be dispatched before lower priority messages. Message ordering is not assured at the transmission queue level (i.e., the first level queue). In other words, different transmissions can be implemented in any order so long as all messages within a transmission (in the second level queue) are transmitted in order. If during a transmission of messages or message portions from a second level queue an interrupt occurs, the hardware controlling the queues moves on to another transmission without having to waste network bandwidth. At such time, the hardware moves to a next transmission in the first level queue, if any, or proceeds to a next lower priority queue. The discontinued transmission is again reached after the hardware has dispatched or attempted dispatch of other transmissions residing in the first level queue.

For each message dispatched, the nodal hardware establishes a route between the source node and the destination node and transmits the contents of a message from a second level queue. Only when an acknowledgement is received that the message has arrived at the destination node, does the source node send a next message from the second level queue. This protocol enables an ordering of messages from the second level queue. Additional handshaking between the source and destination nodes is avoided to reduce network latency.

If an acknowledgement is not received, the source node retries the transmission, possibly causing message duplication at the destination node. Message software at the destination node detects and drops duplicated messages by using a session-level sequence number. The source node software maintains a sequence number for each transmission. This number is increased by one for every message dispatched during the transmission. The source node embeds this number in every message that is dispatched as a portion of a transmission. The destination node remembers the sequence number of the last message that has arrived for the transmission. If a sequence number of a new message appears at the destination node that is greater than that of the last message in the transmission, it is used. Otherwise, it is a duplicate message and is dropped.

Hereafter, the nodal array and node structures will be described with reference to FIGS. 1 and 2. The hardware and software control data structures required to implement the invention will be described with reference to FIGS. 3a–3d, and the overall operation of the hardware and software to implement the message protocol of the invention hereof will be described in relation to FIG. 4.

NODAL ARRAY AND NODE STRUCTURES

FIG. 1 illustrates a disk drive array 10 configured, for example, as a multi-node network. Nodes A and D are data storage nodes that connect to coupled disk drives 12, 14 and 16, 18, respectively. While only four disk drives are shown, one skilled in the art will realize that disk drive array 10 can include many more disk drives. A pair of communication interface nodes B and C provide input/output communication functions for disk drive array 10. Host processors are coupled to nodes B and C via communication links. Disk drive array 10 further includes a cache node E which provides a temporary storage facility for both input and output message transfers. Disk drive array 10 is expandable by addition of further nodes, all of which are interconnected by a communication network 20.

Figure 2:
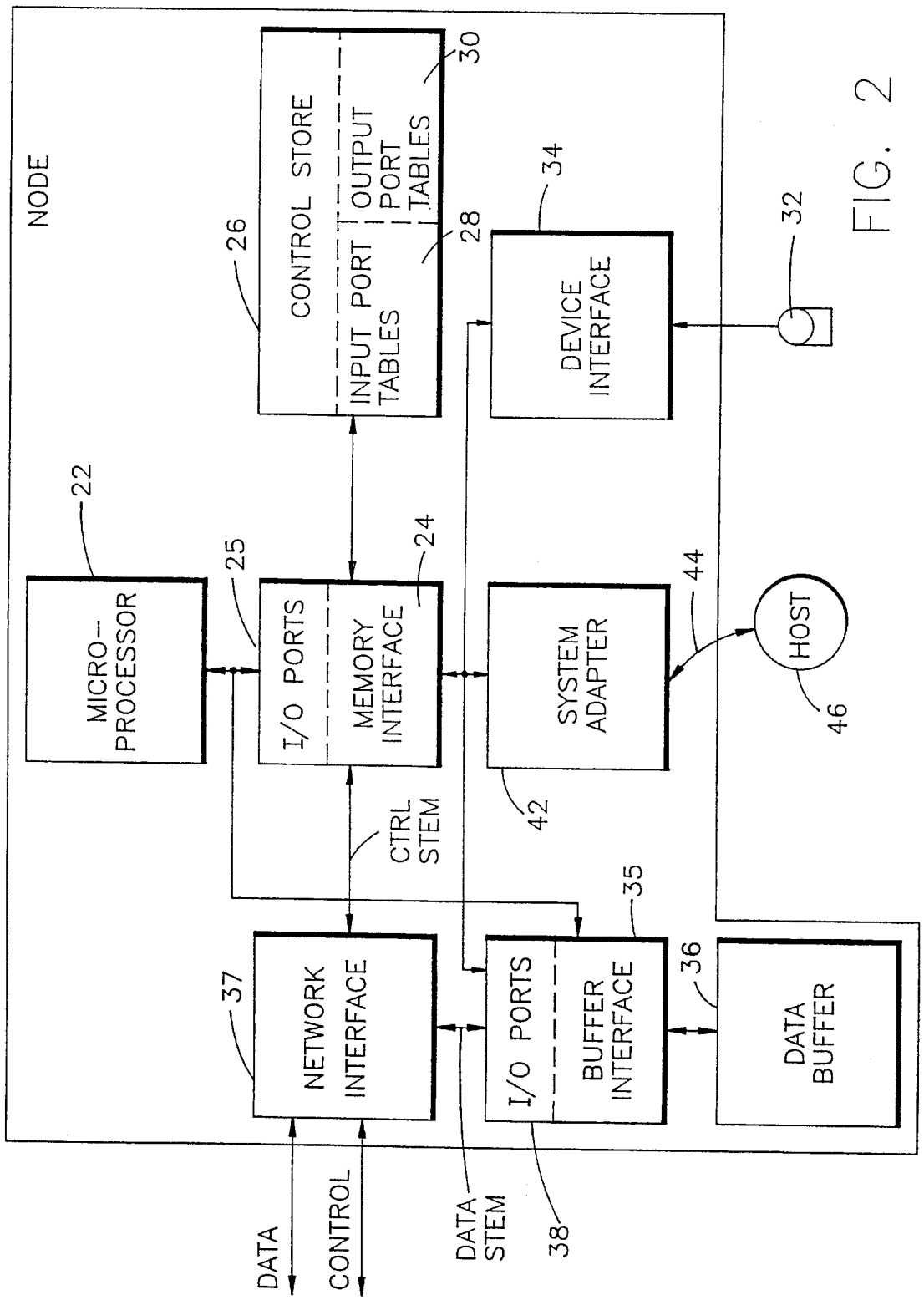
FIG. 2 is a block diagram of an exemplary node employed in the system of FIG. 1.

Each of nodes A–E in FIG. 1 is configured in a standard node arrangement shown in FIG. 2. A node includes a microprocessor 22 that controls the overall functions of the node. A memory interface module 24 controls communications between microprocessor 22 and plural memory modules within the node. Memory interface module 24 also includes input/output hardware 25 for handling of control messages. Control messages are stored in a connected control store 26 which also contains code that controls the operation of microprocessor 22. Among other control code contained within control store 26 is an input port table 28 and an output port table 30. As will become apparent from the description below, a node includes many logical input/output ports, and an input port table 28 and an output port table 30 are provided for each physical input/output port. Entries in those tables correspond to the logical input/output ports.

The node of FIG. 2 includes plural disk drives 32 (only one is shown) that are connected via device interfaces 34 to memory interface 24 and a data buffer interface 35. Data buffer interface 35 connects a data buffer 36 to a network interface 37. Data buffer 36 provides buffering functions for both incoming and outgoing data messages (as contrasted to control messages). Buffer interface 35 further includes input/output hardware ports 38 for handling of received data. Input/output hardware ports 38 in buffer interface 35 and input/output hardware ports 25 in memory interface 24 are controlled by entries in input port tables 28 and output port tables 30 in control store 26. Network interface 37 provides interface functions for both incoming and outgoing message transfers.

Operations within the node of FIG. 2 are controlled by software-generated control blocks. For any read or write action, plural control blocks are assigned by software working in conjunction with microprocessor 22 to enable setup of the hardware within the node in accordance with a required action. For any single read or write, the software assigns plural control blocks. Each control block includes at least one parameter required to enable a setup action by the hardware that is required during the read or write.

Control block data structures enable the node of FIG. 2 to assemble a message that is to be transmitted to either another node, to a disk drive or to a host processor. The message may be assembled through use of plural control blocks that are "chained" so that one control block includes a pointer to a next control block. Control blocks further indicate a data processing action to occur that will enable assembly of data for a message, where the data is to be found, a designation of its structure, identification of buffer storage for holding the data comprising the message pending dispatch, and further data which identifies where the data is to be dispatched. The invention makes use of input control blocks (ICBs) and output control blocks (OCBs). Each ICB and OCB respectively comprise a message. OCBs may be "chained" and as such, define a series of messages that have a sequence dependency that tracks the sequence of the chained blocks. The invention enables the ordered sequence of messages defined by the chained control blocks to invariably be retained during a transmission, even if the transmission is interrupted and later recommenced.

SOFTWARE CONTROL BLOCK DATA STRUCTURES

To better understand the invention, a description will hereafter be provided of the control data structures that are employed in the node of FIG. 2. In FIGS. 3a–3d, combined hardware/software block diagrams illustrate control block data structures which enable both data messages and control messages to be dispatched from a source node and received at a destination in the required order.

Figure 3A:
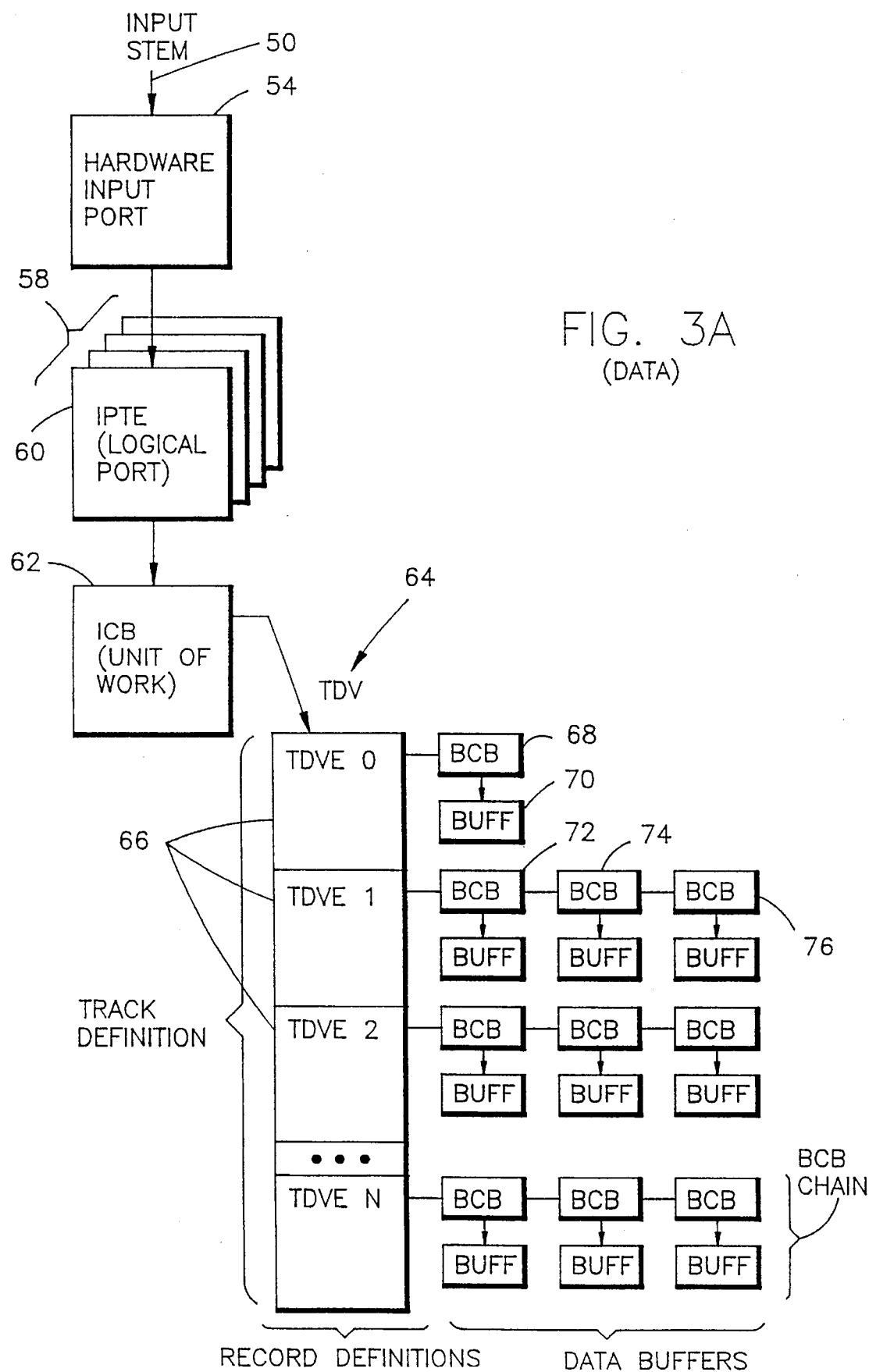
FIG. 3a is a diagram showing hardware and software control blocks that enable data messages to be received and stored.
Figure 3B:
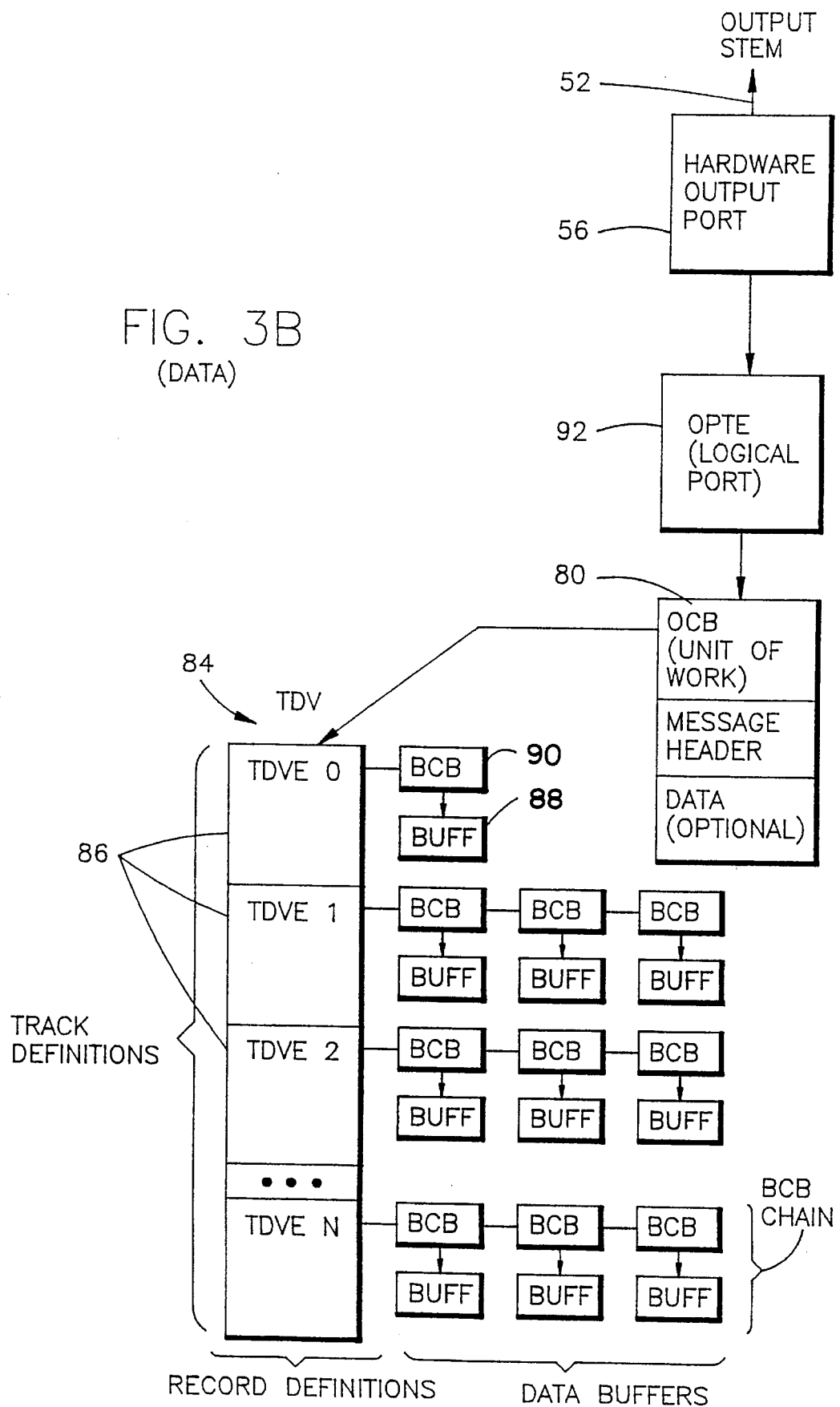
FIG. 3b is a diagram showing hardware and software control blocks that enable data messages to be compiled and transmitted.
Figure 3C:
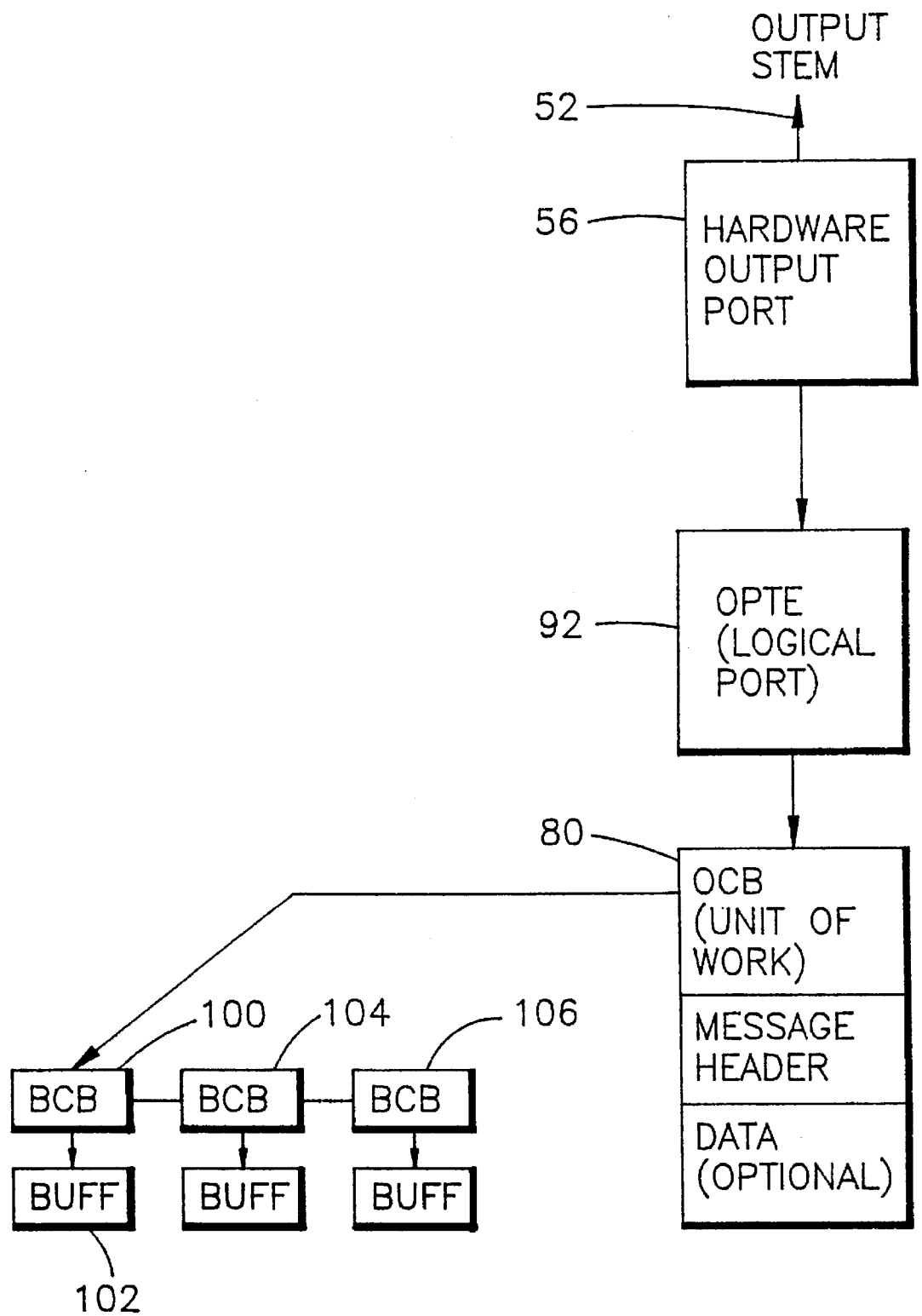
FIG. 3c is a diagram showing hardware and software control blocks that enable control messages to be compiled and transmitted.
Figure 3D:
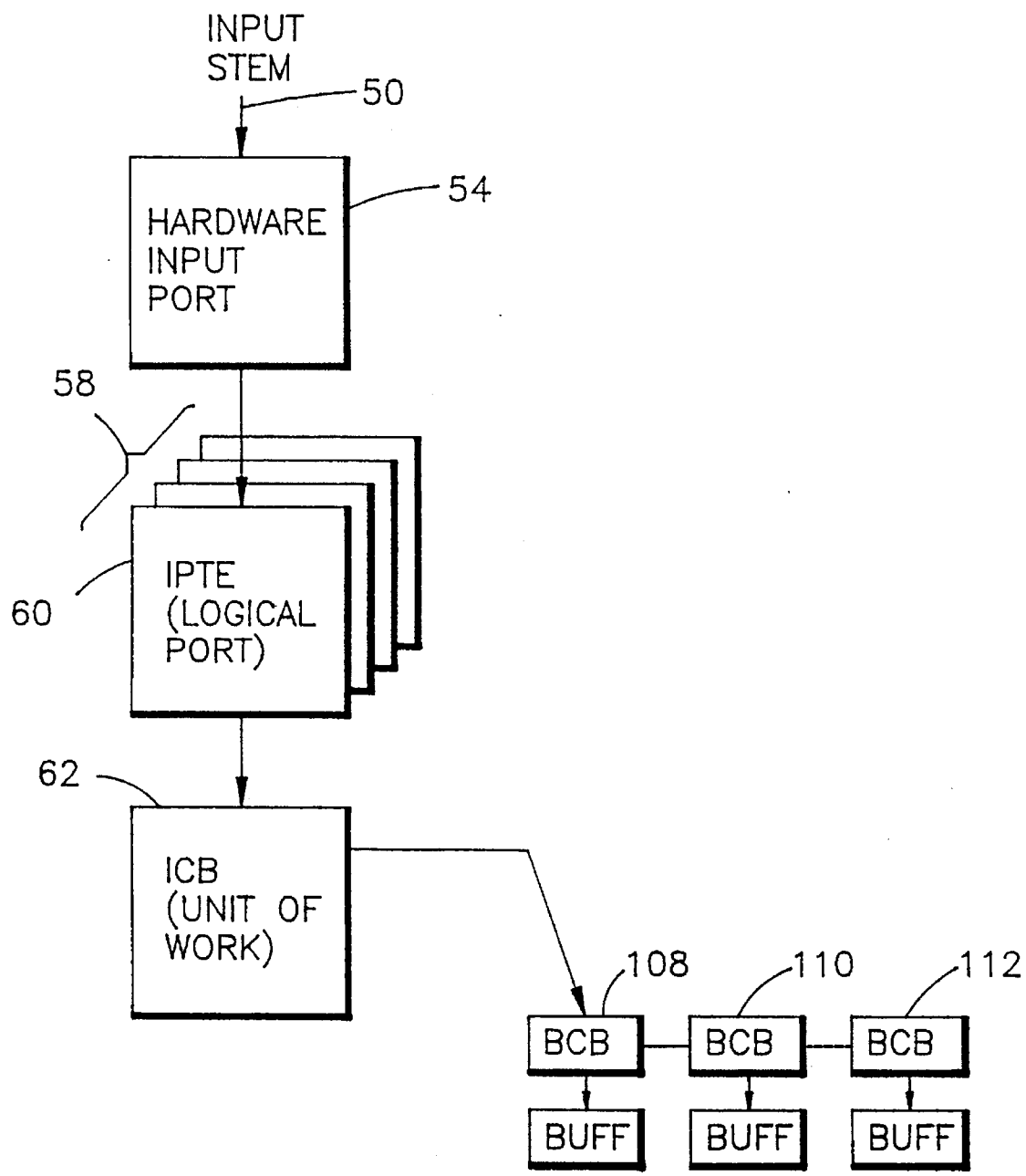
FIG. 3d is a diagram showing hardware and software control blocks that enable control messages to be received and stored.

Referring to FIGS. 3a and 3b, each node includes an input stem 50 and an output stem 52 that, respectively, handle incoming data messages and outgoing data messages. FIGS. 3c and 3d illustrate output and input stems, respectively, for control messages.

Input stem 50 (FIG. 3a) includes a hardware input port 54 which is matched by an equivalent hardware output port 56 (see FIG. 3a) in output stem 52. Hardware input port 54 is a physical entity in buffer interface 34 (see FIG. 2) that is used to manage processing and storage of in-bound data messages to a node. Hardware input port 54 and hardware output port 56 both have a set of associated hardware registers (not shown) which receive control data from control block data structures to be hereafter described. When all of the requisite control data is inserted into the hardware input/output port registers, a particular data processing action can then be accomplished (e.g., a message assembly and transmission) - using the control data present in the registers.

Hardware input port 54 is associated with an input port table 58 that lists the many logical input ports assigned to hardware input port 54. Each logical port is defined by an input port table entry (IPTE) 60, a portion of whose data structure is shown in Table 1 below.

TABLE 1

INPUT PORT TABLE ENTRY (IPTE)

FIRST ICB
LAST ICB
FLAGS
TAG 1
POINTER TO OUTPUT HARDWARE PORT
POINTER TO OUTPUT LOGICAL PORT

An IPTE 60 includes a designation of a first input control block (ICB) required to commence a data processing action (e.g., a message store action), and a designation of the last input control block (ICB) that terminates the data processing action. Intermediate ICBs are determined by chaining values contained within the individual control blocks and define messages whose order is to be maintained in a transmission. Thus each ICB comprises a complete message and all control blocks chained from an ICB define data comprising the message and constitute a transmission. ICBs also describe a data processing function and enable location of data to be subjected to the data processing action.

An IPTE 60 further includes: flags which define interrupt conditions, status states, response states, etc., a "tag 1" value, and pointers to both output hardware port 56 and a logical output port. These entries are not directly relevant to the functioning of this invention, but are presented for completeness' sake. Those skilled in the art will realize that control messages received at a destination node prior to a data message's reception enable the node to set up the various entries in IPTE 60 and all ICBs that are chained therefrom. When an input data message is received by hardware input port 54, depending upon the required data processing action, a series of ICBs 62 (FIG. 3a) are assigned by the software to enable the execution of the required action. The data structure of relevant portions of an ICB is shown in Table 2 below.

TABLE 2

INPUT CONTROL BLOCK (ICB)

NEXT ICB POINTER
FLAGS (e.g. ENABLE COMPLETION INTERRUPT)
TAG 1
SECTOR LENGTH
SECTOR COUNT
START TDVE
END TDVE
TDV/BCB POINTER

Each ICB 62 includes a next ICB pointer which is an address value of a next ICB data structure. It is this next ICB pointer value which accomplishes a chaining action between ICBs. The pointer to the first ICB, as above indicated, is contained in an IPTE 60. When the first ICB is accessed through use of that pointer, all ICBs associated with the macroscopic data processing action can be determined by Succeeding ICB pointers that are included in ICBs that are chained. An ICB defines, by virtue of various flags contained within it, a particular input-related data processing action to be performed.

An ICB further includes information that enables location of data within a disk drive track, i.e. sector length, sector count and a "track descriptor vector" pointer (TDV). A TDV 64 is a table which includes entries that define a logical disk track that may comprise plural physical disk tracks. TDV 64 includes one or more track descriptor vector elements (TDVEs) 66. Each TDVE 66 is a control block which describes a physical disk record's format on a disk drive.

In addition to a start TDVE pointer, an ICB also includes an end TDVE pointer so that all records required for the ICB action are identified by data within or accessible from the ICB. Further control data is present in an ICB, but is not relevant to the invention described herein.

As above indicated, each ICB includes a pointer to a start TDVE 66. The TDVE data structure is illustrated in Table 3 below and contains a description of a record on a track.

TABLE 3

TRACK DESCRIPTOR VECTOR ELEMENT (TDVE)

FIELD 1 DATA ID (e.g. COUNT)
FIELD 2 LENGTH (e.g. KEY)
FIELD 3 LENGTH (e.g. DATA)
FLAGS
FIRST BCB
TAG 1
TAG 2
RECORD NUMBER

Assuming that records on a disk track are arranged using the known "Count, Key, Data" structure, a TDVE will include field descriptors for each of the Count, Key and Data fields. The Count key field will include the record count number that occurs in field 1 of the record; the field 2 value will include the length of the record name (i.e, the Key); and the field 3 value will indicate the length of data in the data portion of the disk record.

As with other control blocks (remembering that each TDVE 66 is a control block), flags are included in a TDVE 66 which define interrupt states, control states, etc. A TDVE 66 further include a pointer to a first buffer control block (BCB) 68. A BCB 68 includes control data to enable set up and assignment of physical buffer space to be employed during a data write action (for example) and enables accomplishment of the individual actions needed to assemble a received message for writing to disk. As will be hereafter apparent, BCBs may also be chained and the invention assures that their dispatch in a transmission is in their order of chaining, even in the event of an interrupted transmission.

A TDVE 66 next includes a tag 1 value (as aforedescribed) and also a tag 2 value that enables subsequent control blocks to be identified as property associated in the macroscopic data processing action.

As indicated above, each TDVE 66 includes a pointer to a first buffer control block (BCB) 68 that defines what portion of memory should be allocated as a buffer for the write action (for example). A BCB 68 data structure is shown in Table 4 below.

TABLE 4

BUFFER CONTROL BLOCK

NEXT BCB POINTER
DATA BYTES IN BUFFER
TAG 1/2
BUFFER SIZE
FLAGS
BUFFER ADDRESS

A BCB 68 data structure commences with a pointer to a next BCB, it being realized that plural buffer locations may be allocated to a data write/data read operation. Referring back to FIG. 3 *a*, assume that an ICB 62 includes a pointer to TDV 64, with TDVE 0 defining a first record required to accomplish a data write action. Recall that ICB 62 includes both a start TDVE pointer and an end TDVE pointer which, in the case shown in FIG. 3*a*, is TDVE N. Each TDVE 66 further includes a pointer to a BCB that defines an amount of buffer space (e.g. buffer 70) required to store the data record. Other TDVEs may include a pointer to plural chained BCBs 72, 74, 76, which define additional buffer areas within memory to be allocated.

Returning to Table 4, each BCB data structure includes a next BCB pointer that enables a chaining of BCBs. A next value in a BCB data structure defines the number of data bytes stored in the physical buffer space. A further entry is a tag 1 or a tag 2 value (not used for this invention). Each BCB data structure further includes a designation of the required buffer size, flags for various control functions and the address of the first buffer address in the buffer memory.

Two additional control block structures are employed in the output stem to enable dispatch of messages. As shown in FIG. 3*b*, those control block structures are output control blocks (OCBs) 80 and output port table entries (OPTEs) 82. OCB and OPTE control block data structures are illustrated in Tables 5 and 6 and enable each unit of data accessed from disk to be provided to hardware output port 56 in output stem 52 (FIG. 3*b*).

TABLE 5

OUTPUT CONTROL BLOCK (OCB)

NEXT OCB POINTER
START TDVE
END TDVE
FLAGS
TAG 1
DESTINATION ADDRESS
LOGICAL INPUT PORT ADDRESS AT DEST.
MESSAGE DATA (FOR CONTROL)
TDV/BCB

TABLE 6

OUTPUT PORT TABLE ENTRY (OPTE)

START OF OCB CHAIN
END OF OCB CHAIN
FLAGS
NEXT OPTE
INPUT PHYSICAL PORT
INPUT LOGICAL PORT

An OCB 80 data structure (Table 5 and FIG. 3*b*) includes a pointer to a next OCB. It also includes a pointer to TDV table 84, a start TDVE pointer and an end TDVE pointer. hose pointers, in combination, enable identification of all TDVEs 86 which define data stored in various buffers 88 to be accessed (via pointers to BCBs 90 contained in each pointed-to TDVE and intermediate TDVEs). Next, flags are included which define various control functions and interrupt states.

An OCB 80 further includes a destination address for the data and a logical input port address at the destination where the data is to be directed. Under certain circumstances, an OCB 80 may also include control message data to enable control information to be transmitted to a destination address.

Table 6 illustrates an OPTE 92 data structure which is substantially similar to an IPTE 60 but with reference to OCBs 80 that are chained to provide outgoing data. An OPTE 92 includes a pointer to a start of an OCB chain and a pointer to the end of the OCB chain. Flags are included which define interrupt states and other control functions. An OPTE 92 also includes a pointer to a next OPTE 92 so as to enable a chained series of OPTEs to be fed to the output via the ready queue. Pointers are also included to the input physical port and the input logical port and are used for functions unrelated to this invention.

The above description has considered control block data structures needed to accomplish data message transfers. As shown in FIGS. 3*c* and 3*d*, similar control blocks are used to enable dispatch and receipt of control messages. However, due the relative simplicity of control messages, the use of a TDV table (and its TDVEs) is unnecessary. As a result, in a control message source node (FIG. 3*c*), an OCB 80 includes a pointer to a BCB 100 that defines a first portion of a control message that is stored in buffer 102 Additional BCBs 104,106, etc. may be chained from BCB 100. Similarly, in a control message destination node (FIG. 3*d*), an ICB 62 includes a pointer directly to a BCB 108, and indirectly to. chained BCBs 110 and 112. These control block structures enable a control message to be assembled in a source node and to be received and stored in buffer in a destination node.

MESSAGE ASSEMBLY

Assume that Node A (see FIG. 1) is to commence a transmission of a control message to Node E. At such time, microprocessor 22 in Node A commences assembly of control blocks which will enable the control message to be dispatched via its output stem. As indicated above, the invention uses the concept of a transmission. All messages to be dispatched during a single transmission (either continuously or discontinuously) are sequence dependent and are invariably transmitted in the order of sequence dependency. Each OCB defines a message by pointing to one or more BCBs that further define portions of the message, all of which are sequence dependent. Transmissions, per se, have no ordered priority and may be dispatched in any sequence.

A requirement to dispatch a control message causes generation of an OPTE 92 (see FIG. 3c) which includes a pointer to an OCB 80 that, in turn, points to all BCBs that define the control message to be dispatched during a single transmission. The chained BCBs in turn define buffer store areas containing the actual control message. For instance, in FIG. 3c, OCB 80 has BCBs 100, 104, 106 chained therefrom, each pointing to a separate buffer memory area.

As a result of an earlier dispatched control message, Node E, in preparation to receive the control message from Node A, assigns a logical input port to receive the control message, defines an IPTE data structure, an ICB data structure and BCB structures are defined. Those logical data structures enable the control message to be stored in the defined buffer areas. Such structures are illustrated in FIG. 3d wherein IPTE 60, ICB 62 and BCBs 108, 110 and 112 will enable storage of the control message received during a transmission.

Once all of the aforesaid data structures have been created and are present in control block registers within hardware output port 56 (FIG. 3c) and hardware input port 54 (FIG. 3d), the actual data processing action can take place to accomplish the transmission between source Node A and destination Node E

HARDWARE/SOFTWARE CONTROL OF MESSAGE TRANSMISSION ORDERING

Figure 4:
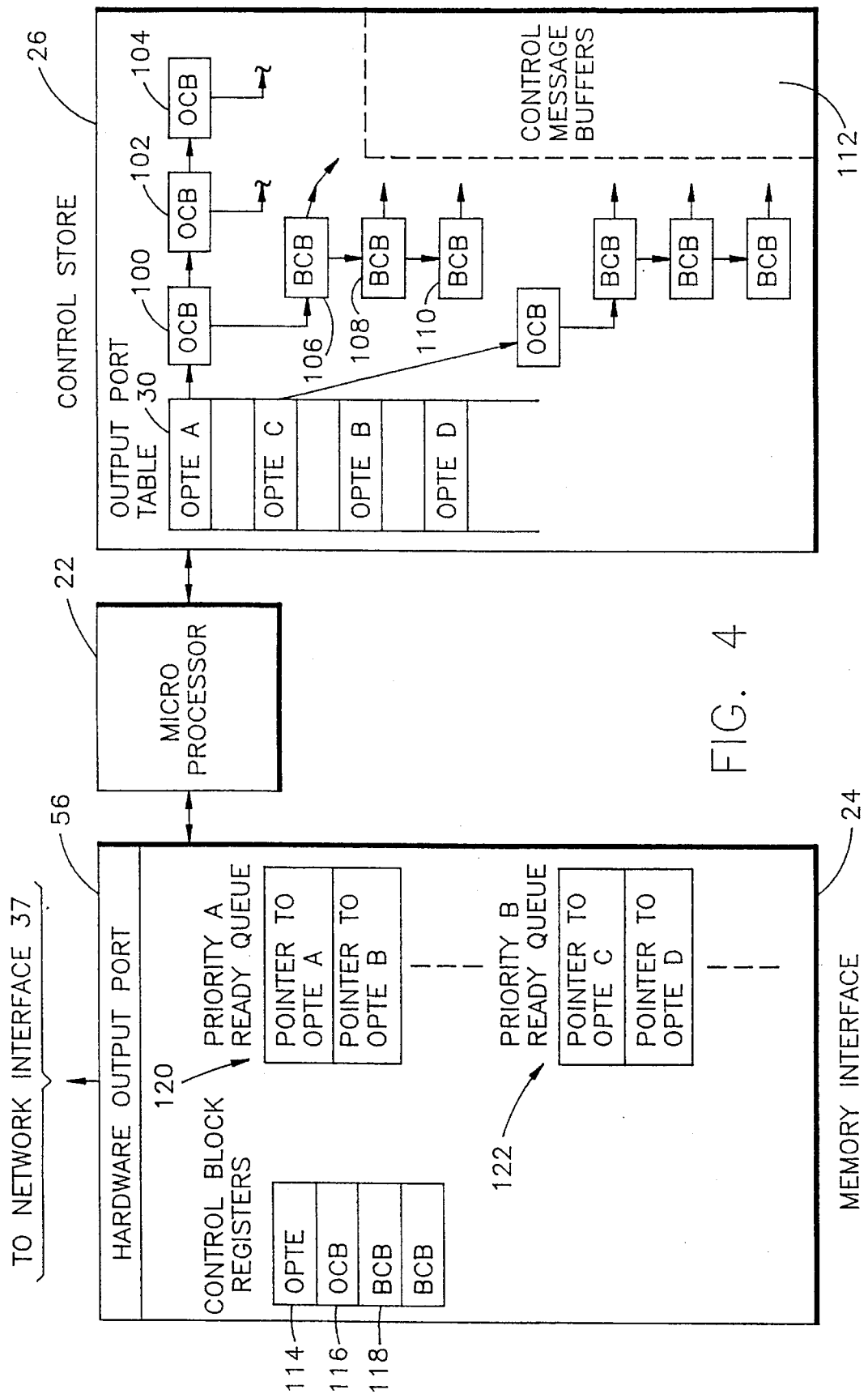
FIG 4 is a combined hardware/software block diagram which illustrates the operation of a node in carrying out the invention hereof.

Referring to FIG. 4, the procedure will be described for assuring control message ordering within a transmission. Initially assume that output port table 30 in Node A contains OPTEs A–D which define, via chained OCBs, message data that is to be transmitted during plural transmissions. For instance, OPTE A includes a pointer to OCB 100, which includes a pointer to OCB 102 and, indirectly, to OCB 104, etc. OCB 100 includes a pointer to BCB 106 which in turn has BCBs 108 and 110 chained therefrom. BCBs 106, 108 and 110 include pointers to storage areas within control message buffers 112 which include control message data to be dispatched via network interface 37 to a destination node.

The control message data pointed to by OCB 100 must be dispatched to and acknowledged by the destination node before the control message data pointed to by OCB 102 can be dispatched and before the message data pointed to by OCB 104 can be dispatched. Note, however, that output port table 30 includes further OPTE's which are independent and form a portion of other messages. As such, data pointed to by entries in OPTE's B,C,D may be transmitted in any order, so long as data pointed to by an OPTE (and any subsidiary OCBs) is invariably transmitted in order of dependency.

Within memory interface 24 is hardware output port 56 which includes plural control block registers 114, 116, 118, etc.

Each control block register is loaded with control information from the indicated control block so as to enable operation of the system during execution time. Hardware output port 56 further includes a pair of ready queue registers 120 and 122. Ready queue register 120 is reserved for control messages evidencing priority A and, in this instance, it is assumed that control messages chained from OPTE A and OPTE B are priority A and are ready for dispatch to a destination node or destination nodes. Ready queue register 122 contains pointers to OPTE C and OPTED which are also ready for dispatch but evidence a lower priority, i.e., priority B. Hardware output port 56 further handles control message dispatch and reception of acknowledgements from a destination node.

In operation, hardware output port 56 initially accesses the pointer to OPTE A from priority A ready queue register 120. The control block data comprising OPTE A, OCB 100, BCBs 106,108 and 110 are loaded into control block registers 112–118, etc., respectively. Under control of entries in these registers, data from control message buffer 112 is accessed and transmitted via hardware output port 56.

As above indicated, a transmission-level sequence number is assigned to OPTE A and is increased by one for every message portion sent out during the transmission for OPTE A. Assume that the data pointed to by OCB 100, and BCBs 106 and 108 are transmitted, but a disconnect occurs before the message portion in the buffer pointed to by BCB 110 can be transmitted. The disconnect procedure causes the destination node to acknowledge receipt of the last successfully received data. Microprocessor 22 stores the status of the message and causes hardware output port 56 to go to the next entry in the priority A ready queue 120. As a result, a new transmission is commenced for OPTE B. OPTE A remains listed in ready queue register 120 and will be later accessed when reached after hardware output port 56 has handled other priority A entries in ready queue register 120.

A similar search of the ready queues occurs if after an entire control message (as manifest by OCB 102, for example) is transmitted, and acknowledged, but no path can be found to transmit the control message represented by OCB 104. Note that a destination node acknowledges receipt of a message (as defined by an OCB) only when all buffers and BCBs chained from the OCB are received. Only when a disconnect occurs during a BCB transmission or between BCBs, does the destination node acknowledge the last BCB received.

When OPTE A is again reached in priority A ready queue register 120, the status is retrieved and the transmission is resumed. This procedure continues until all control data linked to OPTE A has been dispatched and has been acknowledged. In this manner, all control message portions within a transmission are assured of sequential transmission.

Priority B ready queue register 122 is reached if all entries in priority A ready queue register 120 have been successfully handled or all work in priority A ready queue register has been tried, but for some reason blocked. Assume that all the priority A destination nodes are busy. This results in all the Queue A transmissions failing to establish connection. If this happens, the queue management hardware in hardware output port 56 tries a lower priority queue for work (i.e. priority B ready queue 122). If any priority B message makes it through to a destination node an completes then the queue manager goes back to the top of priority queue A and tries to schedule the work again. This repeats until all the work completes.

As above indicated, each subsequent control message (i.e. OCB) is dispatched by hardware output port 56 when an acknowledgement is received from a destination node indicating successful message receipt at the destination node. Thus no subsequent message can be transmitted until a previous message is acknowledged. At the destination node, sequence numbers of messages portions received in a transmission are tracked so as to know which message portions are duplicates or not.

The above description has concerned the dispatch and receipt of control messages in a predetermined order. An identical procedure is implemented for data messages by buffer interface 35, however in this case, the control block structures include TDV tables and respective TDVE entries. Otherwise the procedures are identical and assure that portions of a data message defined by chained OCBs are dispatched in dependency order.

It should be understood that the foregoing description is only illustrative of the invention. Various alternatives and modifications can be devised by those skilled in the art without departing from the invention. For instance, while the invention has been described in the context of the dispatch of messages from a source node to one destination node, the invention assures that multiple destination nodes will receive message portions comprising a transmission in dependency order. Accordingly, the present invention is intended to embrace all such alternatives, modifications and variances which fall within the scope of the appended claims.

We claim:

1. A computing system comprising plural nodes connected by a communications network, each node comprising:

communication interface means for exchanging messages with other nodes;

message queue means for arranging plural message entries in a queue, each message entry comprising a pointer to an output message control structure;

memory for storing plural output message control structures, each output message control structure indicating one or more chained further message control structures that define message portions which together comprise a message, each output message control structure further enabled to be chained to other message output control structures, plural message control structures that are chained exhibiting a sequence dependency; and processor means controlled by message entries in said message queue means for dispatching at least a first message portion and a second message portion under control of first and second chained output message control structures, respectively, said processor means enabling dispatch of said second message portion only after successful transmission of said first message portion upon which said second message portion is sequence dependent; and wherein, each message entry in said message queue means defines a message transmission, all message portions designated by an output message control structure that is pointed to by a message entry exhibiting sequence dependency, said message queue means arranging said message entries in plural queues of different priority orders;

said processor means responsive to an unsuccessful dispatch of a first message portion to discontinue a transmission that includes further message portions of a message transmission that includes said first message portion and to commence a transmission of a second message transmission in accordance with a further message entry queued in a like priority message queue means, said processor means thereafter again attempting to retransmit said message transmission that was interrupted by starting with said first message portion so as to assure dispatch thereof strictly in accordance with said sequence dependency.

2. The computing system as recited in claim 1, wherein said processor means, after discontinuance of a subsequent transmission as a result of a successful or unsuccessful dispatch of a message, again attempts a transmission of a message comprising another transmission until all message portions included in said another transmission are successfully dispatched.

3. The computing system as recited in claim 2, wherein said processor means, upon receiving an indication via said communication means, of an acknowledgement of successful receipt by another node of one message, enables dispatch of a succeeding message that is sequence dependent upon said one message.

4. The computing system as recited in claim 2, wherein said processor means assigns each received message portion a sequential number, said processor operational, when said node receives message portions from another node, to check a sequence number included with said message portion against a highest sequence number of message portions received previously for a transmission, and to discard any message portion whose sequence number equals or is less than said highest sequence number for said transmission.

5. In a computing system comprising plural nodes connected by a communications network, a method for assuring that a node transmits sequence dependent messages in a required sequence order, the method comprising the steps of:

a. arranging plural message entries in a queue, each message entry comprising a pointer to an output message control structure and defining a message transmission;

b. storing plural output message control structures, an output message control structure indicating one or more chained further message control structures that enable access to data comprising a message or a portion of a message, plural said output message control structures that are chained and plural said further message control structures that are chained from an output message control structure all exhibiting a sequence dependency, all output message control structures pointed to, either directly or indirectly, by a message entry exhibiting sequence dependency; and c. dispatching, under control of a message entry in said message queue means, at least first and second messages designated by chained output message control structures, and enabling dispatch of said second message only after successful transmission of said first message upon which said second message is sequence dependent d. arranging said message entries in plural queues of different priority orders;

e. responding to an unsuccessful dispatch of a first message by discontinuing a message transmission that includes said first message and commencing a message transmission including a second message in accordance with a further message entry queued in a like priority queue, and thereafter again attempting to retransmit said message transmission that was unsuccessfully dispatched by starting with said first message so as to assure dispatch thereof strictly in accordance with said sequence dependency.

6. The method as recited in claim 5, wherein upon discontinuance of a subsequent message transmission as a result of a successful or unsuccessful dispatch of a message, again attempting a transmission of a message portion of a message comprising another message transmission until all message portions included in said another message transmission are successfully dispatched.

7. The method computing system as recited in claim 5, wherein, upon receiving an acknowledgement of successful receipt by another node of one message, enables dispatching a succeeding message that is sequence dependent upon said one message portion.

8. The method as recited in claim 7, further comprising the steps of:

assigning each received message portion a sequential number; and when said node receives message portions from another node, checking a sequence number included with said message portion against a highest sequence number of message portions received previously for a transmission, and discarding any message portion whose sequence number equals or is less than said highest sequence number for said transmission.

* * * * *